(12) United States Patent
Hebron et al.

(10) Patent No.: US 10,285,116 B2
(45) Date of Patent: May 7, 2019

(54) METHOD AND APPARATUS FOR PRE-ADMISSION MESSAGING IN A MOCA NETWORK

(71) Applicant: MaxLinear, Inc., Carlsbad, CA (US)

(72) Inventors: Yoav Hebron, San Diego, CA (US); Na Chen, San Diego, CA (US); Ronald Lee, San Diego, CA (US)

(73) Assignee: Maxlinear, Inc., Carlsbad, CA (US)

( * ) Notice: Subject to any disclaimer, the term of this patent is extended or adjusted under 35 U.S.C. 154(b) by 441 days.

(21) Appl. No.: 14/824,792

(22) Filed: Aug. 12, 2015

(65) Prior Publication Data

US 2016/0050106 A1    Feb. 18, 2016

Related U.S. Application Data

(60) Provisional application No. 62/036,545, filed on Aug. 12, 2014, provisional application No. 62/036,496, filed on Aug. 12, 2014.

(51) Int. Cl.
*H04L 12/24* (2006.01)
*H04W 24/02* (2009.01)
*H04W 48/16* (2009.01)

(52) U.S. Cl.
CPC ........... *H04W 48/16* (2013.01); *H04W 24/02* (2013.01); *H04L 41/046* (2013.01)

(58) Field of Classification Search
CPC .............................. H04W 48/16; H04W 24/02
USPC .......... 713/150; 725/109; 370/229, 390, 468
See application file for complete search history.

(56) References Cited

U.S. PATENT DOCUMENTS

| | | | | |
|---|---|---|---|---|
| 2006/0222181 A1* | 10/2006 | Wu | ........................... | H04L 9/00 380/268 |
| 2006/0227746 A1* | 10/2006 | Kim | .................... | H04W 36/005 370/331 |
| 2010/0214916 A1* | 8/2010 | Wu | ..................... | H04L 12/2801 370/230 |
| 2011/0173435 A1* | 7/2011 | Liu | ....................... | H04L 63/061 713/150 |
| 2013/0259034 A1* | 10/2013 | Klein | ................ | H04W 52/0219 370/389 |
| 2013/0268984 A1* | 10/2013 | Salinger | ................ | H04L 47/806 725/109 |
| 2013/0272117 A1* | 10/2013 | Bagasra | .................... | H04J 3/22 370/229 |
| 2015/0019717 A1* | 1/2015 | Li | ....................... | H04L 67/1085 709/224 |
| 2015/0208324 A1* | 7/2015 | McCann | ............... | H04W 48/10 370/338 |
| 2017/0093883 A1* | 3/2017 | Hebron | ................. | H04L 63/123 |

* cited by examiner

*Primary Examiner* — Alpus Hsu
*Assistant Examiner* — Camquyen Thai
(74) *Attorney, Agent, or Firm* — McAndrews, Held & Malloy, Ltd.

(57) ABSTRACT

Systems and methods for admitting new nodes into an existing network, for example a MoCA network. As a non-limiting example, various aspects of the present disclosure provide systems and methods for adding a new node to an existing network without requiring on-site manual configuration, for example utilizing communication between the new node and a network coordinator of the existing network prior to admission of the new node to the existing network.

19 Claims, 9 Drawing Sheets

METHOD AND APPARATUS FOR PRE-ADMISSION MESSAGING IN A MOCA NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 62/036,545, filed on Aug. 12, 2014, and titled "Method and Apparatus for Pre-Admission Messaging to Nodes of a MoCA Network," and from U.S. Provisional Patent Application Ser. No. 62/036,496, filed on Aug. 12, 2014, and titled "Method and Apparatus for Admission to a MoCA Network," the entire contents of each of which are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, such as for example MoCA networks, lack a method and/or apparatus for efficiently adding a new node to the network, for example without requiring on-site manual configuration. Limitations and disadvantages of conventional methods and systems for handling the addition of a new node to a network, for example a MoCA network, will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 6b shows a continuation of the flow diagram started in FIG. 6a.

SUMMARY

Figure 1:
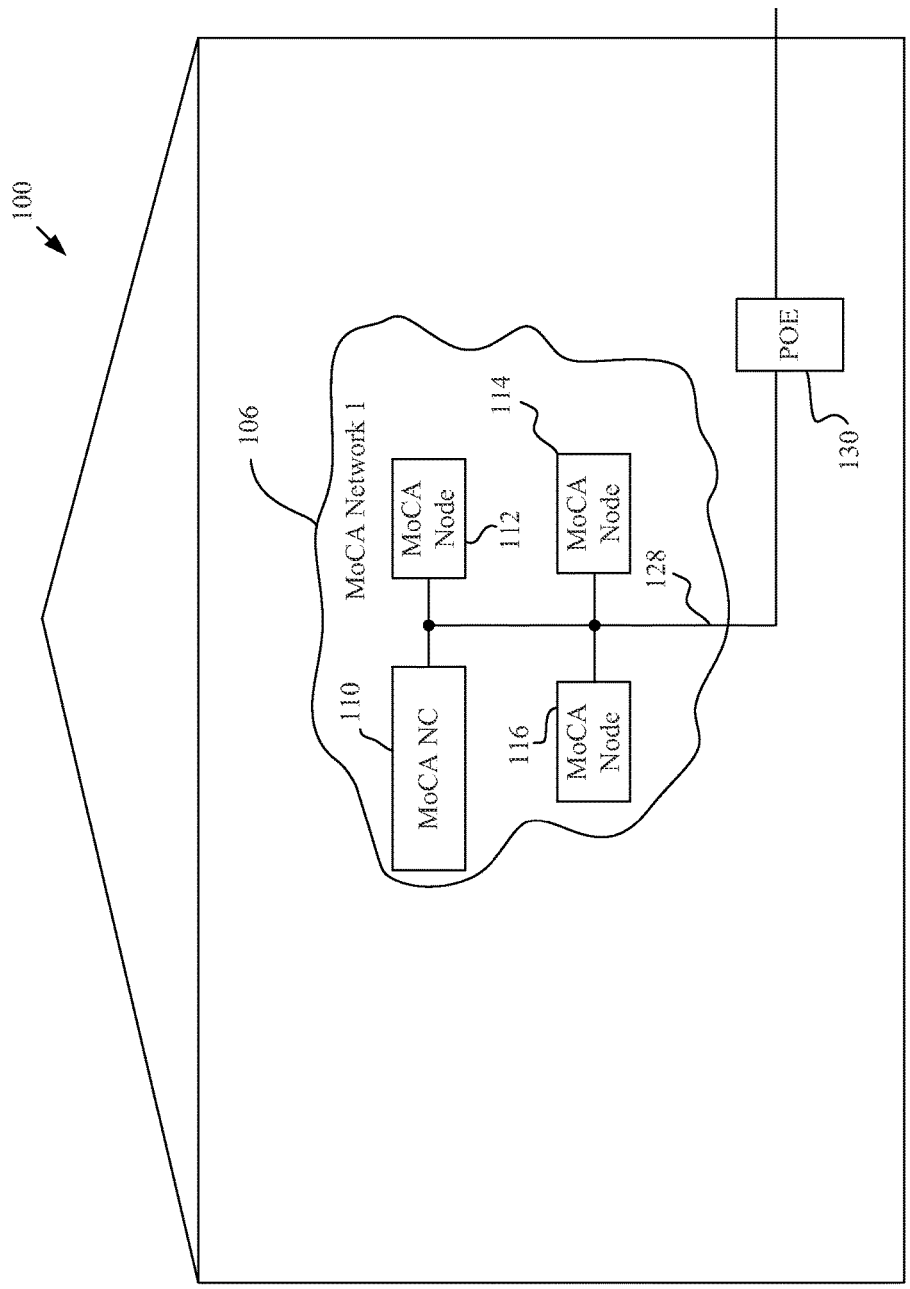
FIG. 1 is a simplified illustration of an example home comprising a MoCA network and nodes.

Various aspects of this disclosure provide systems and methods for admitting new nodes into an existing network, for example a MoCA network. As a non-limiting example, various aspects of the present disclosure provide systems and methods for adding a new node to an existing network without requiring on-site manual configuration, for example utilizing communication between the new node and a network coordinator of the existing network prior to admission of the new node to the existing network.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over a premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

FIG. 1 is a simplified illustration of an example home 100 comprising a MoCA network 106 and nodes 110, 112, 114, and 116. Though only four nodes are illustrated it should be understood that the network 106 may comprise any number of nodes. The nodes of the network 106 are coupled to a coaxial cable medium 128. In the example network 106, the signals present on the coaxial cables of the network 106 are available to each of the nodes 110, 112, 114, and 116.

When a user of the network 106 wishes to add a new node to the network 106, network information may need to be provided to the new node prior to the new node being able to gain access to the network. Additionally, it may also be useful or necessary for the network 106 to receive information from the new node to determine whether the new node should be admitted to the network. Before substantive communication can occur between the new node and other nodes 110, 112, 114, and 116 within the network 106, however, the new node often needs to be admitted to the network. In such an example scenario, the information needed by the new node may need to be obtained (or read) by a professional technician and then programmed into the new node. Relying on a professional technician for the installation of a new node is inefficient and expensive.

Accordingly, various network configurations may benefit from methods and apparatus that make at least some network information available to a new node that is not yet admitted to the network and/or provide information about the new node to the network. Various examples provided herein may, for example, facilitate establishing a new network and/or installing a new node in an existing network without the need for a professional technician. Additionally, providing such information between the new node and the network may allow an operator (e.g., an Operator Service Provider (OSP) or other operator) to determine whether there is sufficient isolation between different networks (e.g., between different premises-based network, for example a MoCA network). The operator may thus know when to send a technician to the network site to install a point of entry (POE) filter 130 to provide isolation between the networks (e.g., utilizing any of a variety of types of filtering), and know when such installation is unnecessary.

Various aspects of the present disclosure allow a management entity (ME) of a first node (e.g., a new node) to communicate information directly with a management entity (ME) of a second node operating as a network coordinator (NC) (or network controller) without first admitting the first node to the network of the NC. In one example implementation, communication of information between two nodes that are not yet admitted to the same network will allow decisions to be made as to whether to allow the nodes to join the same network. In accordance with one example implementation, the ME of a node that is not yet a member of a network, upon detecting an NC of the network, can instruct the node to send information directly to the ME of the NC.

In accordance with various aspects of the present disclosure, a new node may listen for a Beacon message (also referred to herein as a Beacon) from an NC. Upon receiving the Beacon from an NC, the new node may determine from information contained within the Beacon when to send a Discovery Request message (e.g., a pre-admission Discovery Request message). The new node may then send a Discovery Request message that includes either a Discovery Request Network IE or a Management Entity Request Network IE or both.

In accordance with various aspects of the present disclosure, prior to joining a network, a new node (NN) may receive from its ME a request to send the contents of a specified control parameter in a payload field of a Management Entity Request Network Information Element (IE). For example, the new node's ME may load a control parameter with information to be sent to an NC (or an ME associated therewith) of a network to which the new node has not yet gained admission. The NN may then listen for a Beacon that will indicate when a Discovery Request message can be transmitted to the NC. In accordance with one example implementation, the new node determines whether the duration that the NC scheduled for a Discovery Request message is sufficient to send the Discovery Request message with the information contained in the specified control parameter (e.g., as communicated in a Management Entity Request Network IE of the Discovery Request message). If the duration is insufficient, then the NN first requests bandwidth for transmitting the Discovery Request message. The NN may, for example, request the additional bandwidth by setting a value in a field of a Discovery Request Network IE that indicates the length (or duration) that the NN will require to send the desired Discovery Request message.

Continuing the example, if the NN requests additional bandwidth, then the NC schedules an Admission Control Frame (ACF) slot designated for the NN to transmit a Long Discovery Request message having the indicated length. The NC communicates this scheduled slot in a next Beacon. The NN, upon receiving the Beacon communicating the ACF slot scheduled for the Long Discovery Request message, then sends the Discovery Request message comprising a Management Entity Request Network IE that contains the contents of the control parameter during the scheduled ACF slot.

In accordance with one example implementation, the NC responds to a Management Entity Request Network IE by indicating one of the following:
  (1) The NC supports such a request and the payload of the response includes the contents of an ME control parameter created for the purpose of communicating with a non-network node;

(2) the NC supports this Management Entity Request Network IE, but the ME needs more time for providing the response; or (3) the NC does not support this Management Entity Request Network IE.

In accordance with one example implementation, if the ME of the NC supports the received ME_IE (Management Entity Information Element), when the NC receives the information in a Management Entity Request Network IE, the NC will load the contents of the payload of the Management Entity Request Network IE into a control parameter making it directly accessible to the NC's ME. If the ME of the NC supports the Management Entity Network IE, then the NC's ME will send a Management Entity Response Network IE in response to the Management Entity Request Network IE. The Management Entity Response Network IE is set to indicate that the ME_IE is supported and the response contents are provided in the response payload.

Continuing the example, if the ME of the NC supports the received ME_IE (Management Entity Information Element), but needs more time, then the NC will send a Management Entity Response Network IE indicating that the ME_IE is supported but more time is required by the NC to respond. The NC will wait for the ME to indicate that it has loaded the control parameter with the requested information. As soon as the ME is ready to provide the requested response (e.g., loads the appropriate control parameter as discussed herein), the NC will schedule and send another Management Entity Response Network IE indicating that the ME_IE is supported and the response contents are provided in the response payload. The payload of the Management Entity Response Network IE may, for example, be loaded with the content provided in the control parameter that was loaded by the NC's ME.

Continuing the example, if the ME of the NC does not support the specific ME_IE (e.g., in this case the Management Entity Request Network IE sent from the ME of the NN), then the NC sends a Management Entity Response Network IE (e.g., as part of a Discovery Response message) indicating that the ME of the NC does not support the ME_IE.

Upon receiving the Discovery Response message from the NC (e.g., comprising the Management Entity Response Network IE, etc.), the NN loads the content of the payload of the Management Entity Response Network IE into a control parameter to allow the ME of the NN to access the received information.

Figure 2:
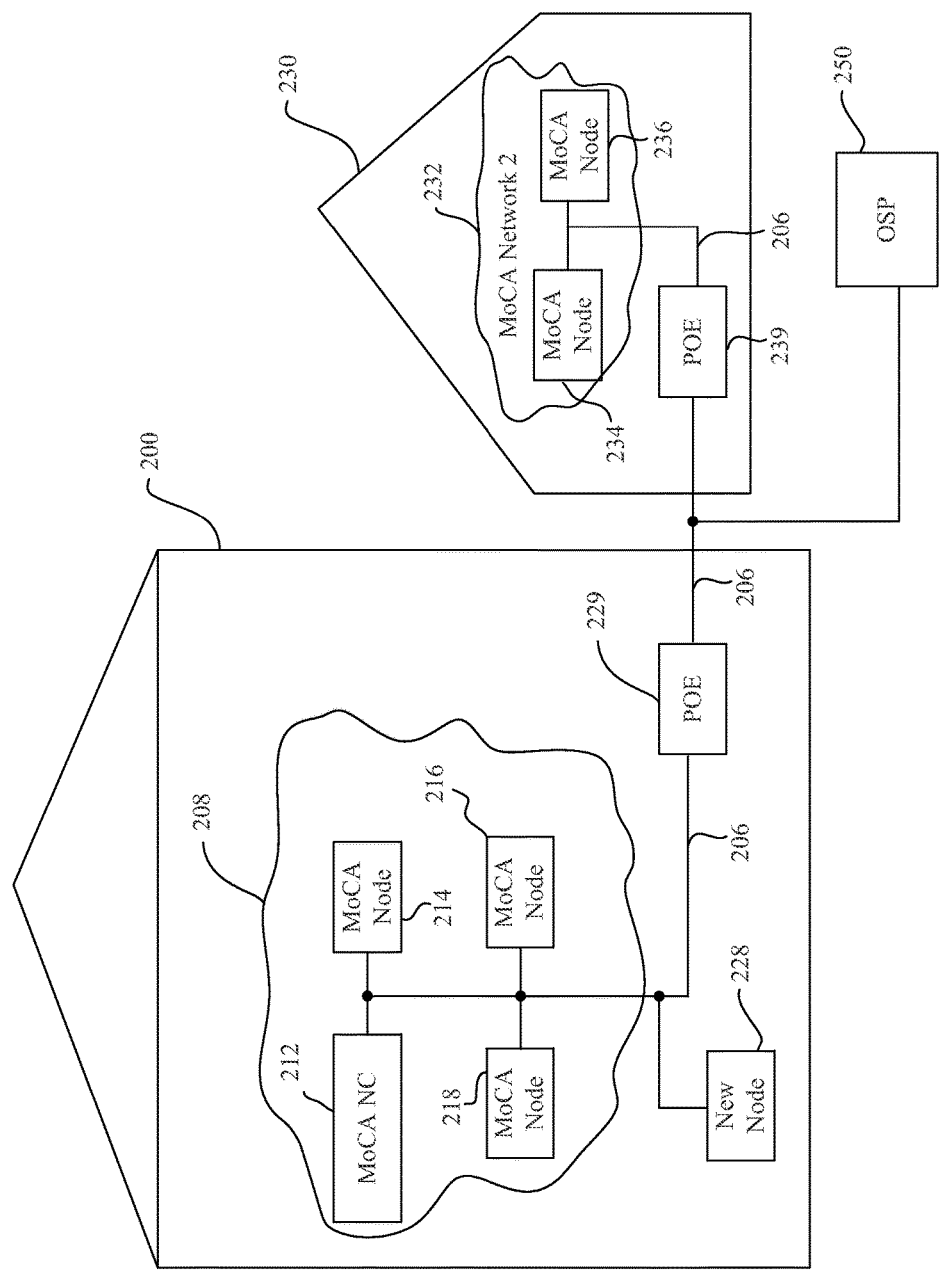
FIG. 2 is an illustration of two example homes, each comprising a respective MoCA network and nodes.

FIG. 2 is an illustration of two example homes, each comprising a respective MoCA network and nodes. The first home 200 comprises a first MoCA network 208, which comprises a plurality of nodes 212, 214, 216, and 218, and a Point Of Entry (POE) device 229. The second home 230 comprises a second MoCA network 232, which comprises a plurality of nodes 234 and 236, and a second Point of Entry (POE) device 239. The environment shown in FIG. 2 also includes an Operator Service Provider (OSP) 250. A first node 212 of the four MoCA nodes 212, 214, 216, and 218 of the first network 208, operates as the network coordinator (NC) for the first network 208. In accordance with one example implementation, each node may be capable of operating as the NC. However, only one NC at a time is utilized for the network. In addition to the four nodes 212, 214, 216, and 218 of the first network 208, a new node (NN) 228 is shown. In one example scenario, the NN 228 has not been admitted to the network 208.

Many of the various aspects of the present disclosure are presented herein in the context of one or more MoCA networks and/or components thereof. It should be understood that the scope of this disclosure is not limited to MoCA networks nor to premises-based networks in general. For example, the various aspects of this disclosure are readily extensible to any of a variety of types of communication networks (e.g., operating in accordance with any of a variety of communication protocols, operating over any of a variety of communication media, etc.).

Figure 3:
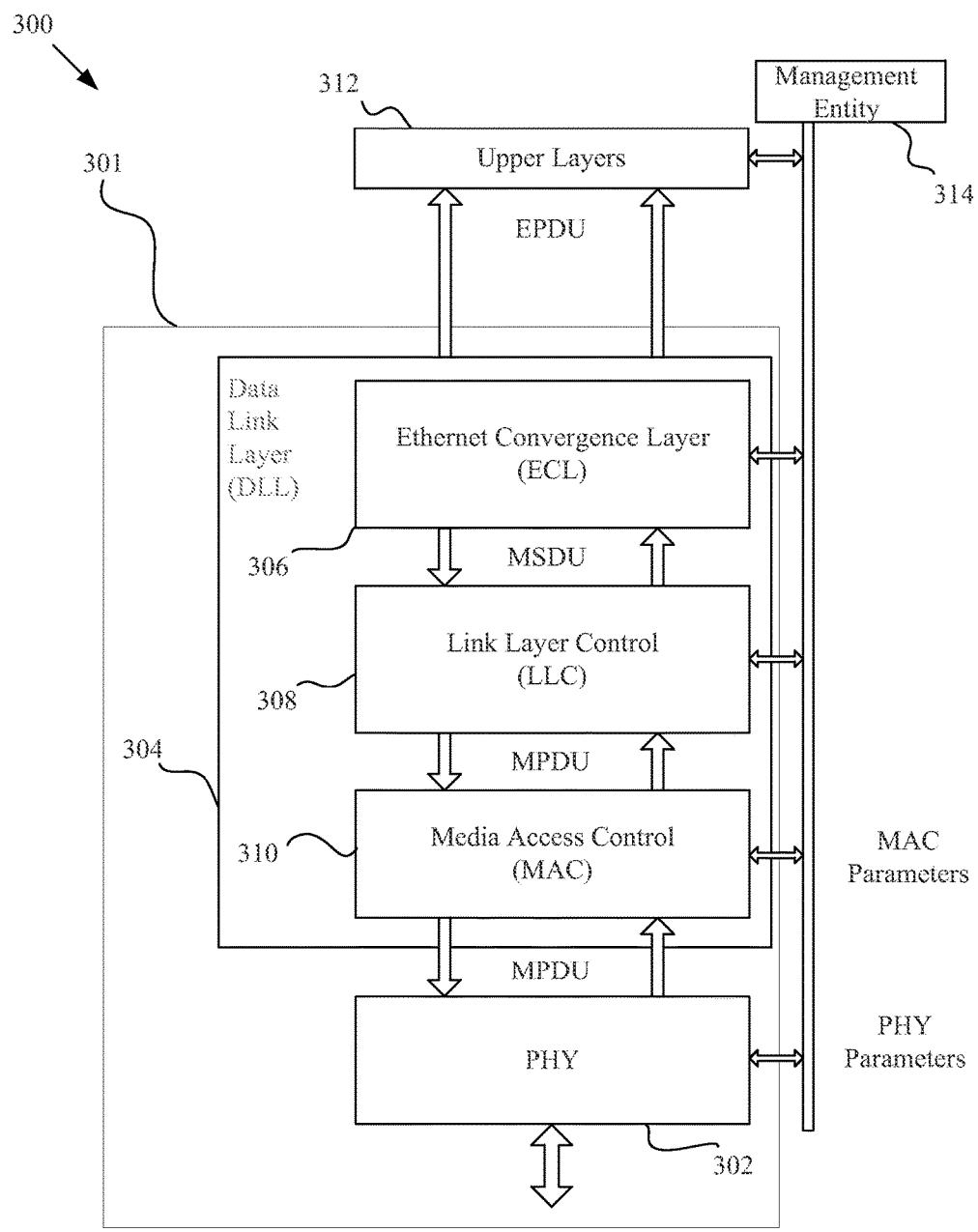
FIG. 3 is a logical block diagram of a network node in accordance with various aspects of the present disclosure.

FIG. 3 is a logical block diagram 300 of a network node 301 in accordance with various aspects of the present disclosure. The network node 301 may, for example, be operable to perform any or all of the node functionality discussed herein (e.g., for a new node 228, network coordinator node 212, existing node 214, 216, and 218, any or all of the nodes discussed herein, etc.). In general, each node discussed herein may be functioning in a manner that is appropriate to the role that node is currently performing. For example, in the scenario illustrated in FIG. 2 and discussed herein, the NC node 212 performs the role of the network NC, the node 228 plays the role of an NN that has not yet been admitted to the network 208, the Existing Node (EN) 216 plays the role of a node that has been admitted to the network 208 by the NC 212, etc. Various functions of the network nodes are disclosed herein in order to understand how each node functions in its role in accordance with various aspects of the present disclosure.

The example node 301 uses the seven layer Open System Interconnection (OSI) model and/or any generally analogous layered communication model. For example, the node 301 may comprise circuitry that operates to implement a physical layer 302 which is responsible for controlling the physical interface to the medium (e.g., cable medium, phone line medium, other wired medium, wireless medium, tethered and/or untethered optical medium, etc.), including transmitting signals over the medium.

The node 301 may comprise circuitry that operates to implement a Data Link Layer (DLL) 304, for example comprising several sub-layers (e.g., an Ethernet Convergence Layer (ECL) 306, Link Layer Control (LLC) 308, Media Access Control (MAC) 310, etc.). The DLL 304 may, for example, be responsible for controlling the higher layer operation above the physical layer and determining the timing and management of messages to be transmitted and received. Accordingly, the DLL 304 may work with the physical layer 302 to perform any or all of the functions discussed herein (e.g., in FIGS. 4-8). In one example implementation, the DLL 304 is implemented by the execution of software running on at least one processor. The DLL 304 and/or any of the layers shown in FIG. 3 may be implemented by any of a variety of types of processing circuitry (e.g., application-specific integrated circuitry, programmable array logic circuitry, discrete logic circuitry, general-purpose processor circuitry, specific-purpose processing circuitry, etc.).

In accordance with various aspects of the present disclosure, a Management Entity (ME) 314 may, for example, comprise a high layer logical device associated with the node 301. The ME 314 or portions thereof may, for example, be collocated with the node 301 and/or may be implemented at a location that is geographically remote from the node 301. The ME 314, for example, uses the node 301 to send and receive information over the network. One example manner in which the ME 314 passes information and commands to and from the node 301 is through a bank of control parameters. Example control parameters used in accordance with various aspects of the present disclosure are listed below. The operations associated with each of such example control parameters will be discussed in further detail herein. The following is an introduction to at least a portion of such control parameters. It should be noted that the names of the example control parameters were selected for illustrative clarity, and thus the scope of this disclosure is not limited to any particular control parameter name or naming convention.

A first example control parameter is ME_NETWORK_IE$_{PAYLOAD\_TX}$. This control parameter may, for example, be used to pass information between the ME 314 and the node 301. For example, if the node 301 is operating as an NN 228 prior to being admitted to a network 208, then the information loaded by the ME 314 into this control parameter may be read by the NN 228 and loaded into the payload of a Management Entity Request Network IE.

Also for example, if the node 301 is operating as an NC 212 of a network 208, then the information loaded by the ME 314 into this control parameter may be read by the NC 212 and loaded into the payload of a Management Entity Response Network IE. The use of the Management Entity Request Network IE and the Management Entity Response Network IE is described in detail herein.

A second example control parameter is ME_NETWORK_IE$_{TX}$. This control parameter may, for example, be an event control parameter. Event control parameters generally allow the node 301 and the ME 314 to pass information regarding process status and/or events. For example, this particular example control parameter may be used to indicate to the node 301 that the ME 314 posted a new value in the ME_NETWORK_IE$_{PAYLOAD\_TX}$ control parameter for transmission. Accordingly, the node 301 may then access and send the contents of ME_NETWORK_IE$_{PAYLOAD\_TX}$ over the network (e.g., as part of a Management Entity Request Network IE, as part of a Management Entity Response IE, etc.).

A third example control parameter is ME_NETWORK_IE$_{PAYLOAD\_RX}$. This control parameter may, for example, be used to pass information between the node 301 and the associated ME 314. For example, if the node 301 is operating as an NC 212, then the node 301 may, for example, load information received by the NC 212 from a Management Entity Request Network IE into this control parameter to be read by the ME 314. Also for example, if the node 301 is operating as an NN 228 prior to gaining admission to the network 208, then the node 301 may load information received by the NN 228 from a Management Entity Response Network IE into this control parameter to be read by the ME 314.

A fourth example control parameter is ME_NETWORK_IE$_{REC}$. This control parameter may, for example, be an event control parameter. ME_NETWORK_IE$_{REC}$ may, for example, be used to indicate that a Management Entity Request Network IE has been received and posted to ME_NETWORK_IE$_{PAYLOAD\_RX}$ when the node 301 is operating as an NC 212, or that a Management Entity Response Network IE has been received and posted to ME_NETWORK_IE$_{PAYLOAD\_RX}$ when the node 301 is operating as an NN 228.

A fifth example control parameter is ME_NETWORK_IE$_{RESP\_TIMOUT}$. ME_NETWORK_IE$_{RESP\_TIMOUT}$ may, for example, be used to indicate the maximum amount of time an NN should wait for a response from an NC to a Management Entity Request Network IE.

Figure 4:
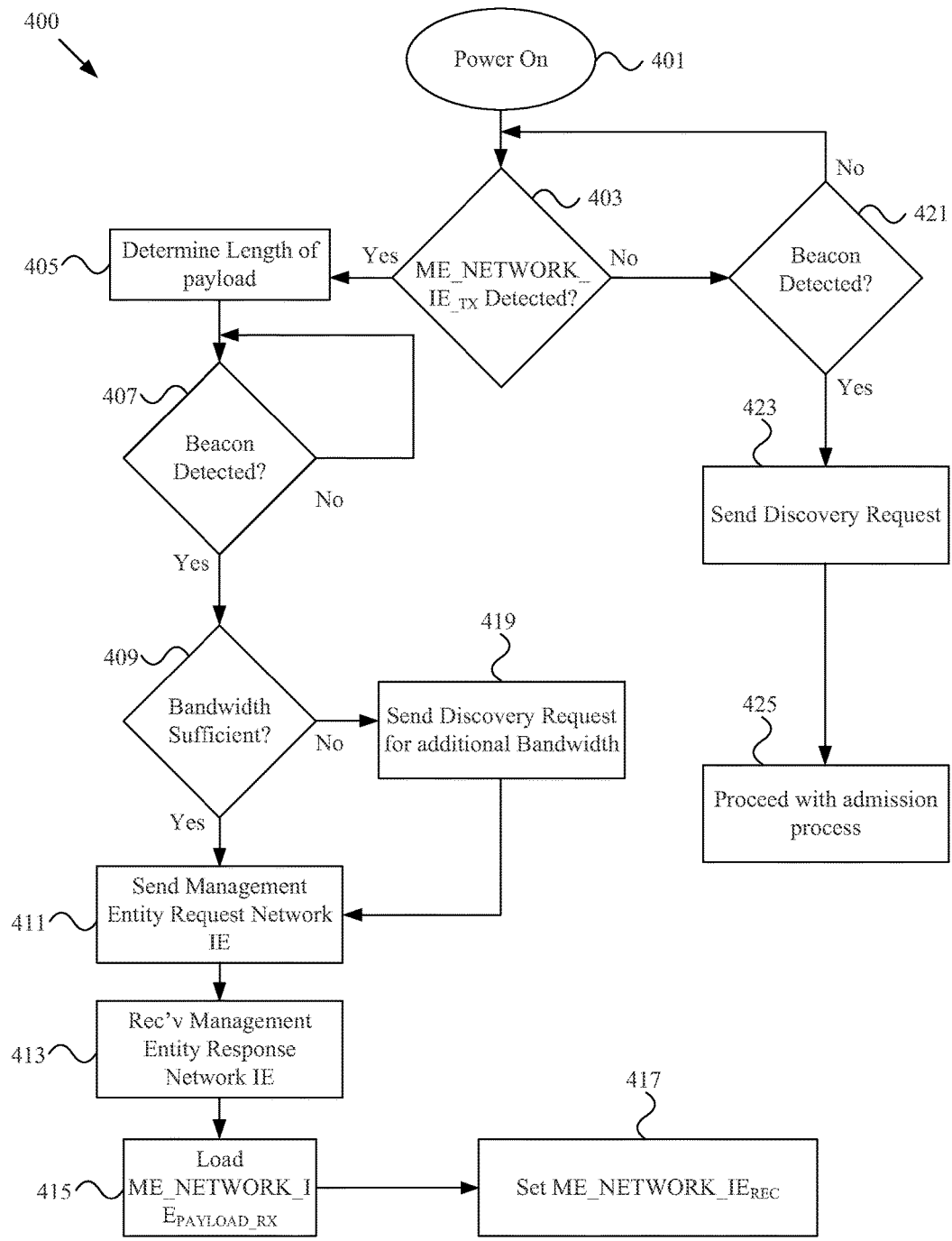
FIG. 4 is a flow diagram of an example method for joining a network, for example performed by a new node, in accordance with various aspects of the present disclosure.
Figure 5:
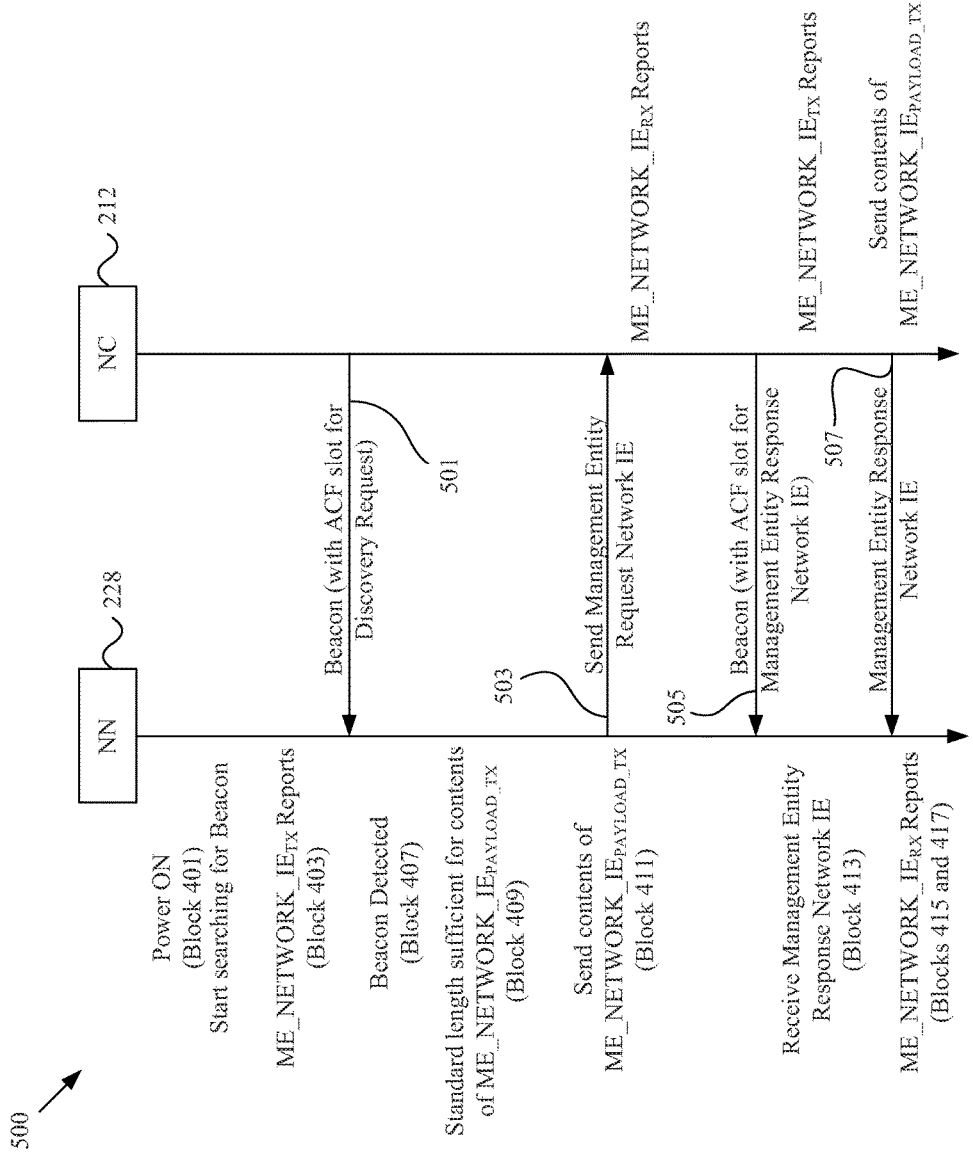
FIG. 5 is message flow diagram showing an example message flow sequence between a new node and a network coordinator, in accordance with various aspects of the present disclosure.

FIG. 4 is a flow diagram of an example method 400 for joining a network, for example performed by a new node, in accordance with various aspects of the present disclosure. FIG. 5 is message flow diagram 500 showing an example message flow sequence between a new node and a network coordinator, in accordance with various aspects of the present disclosure. FIGS. 4 and 5 will now be discussed together. The example method 400 and message flow 500 may, for example, be performed by any of the nodes discussed herein. For example, the example method 400 may be performed by a new network node (e.g., the NN 228 of FIG. 2). Also for example the message flow 500 and/or functionality associated therewith may be performed by a new network node (e.g., the NN 228 of FIG. 2) and a network coordinator node (e.g., the NC 212 of FIG. 2).

The example method 400 begins at block 401. The method 400 may begin executing in response to any of a variety of causes or conditions. For example, the method 400 may begin executing in response to power being applied to the NN 228 and/or a hard reset being performed. Also for example, the example method 400 may begin executing in response to a user command, a command received from a management entity or operator, etc.

As indicated at FIG. 5, after step 401, the NN 228 starts searching for a Beacon message 501 transmitted by a node operating as an NC 212. If at any time prior to joining a network, the NN 228 receives an event from its ME 314 indicating that the ME 314 has placed content in the control parameter ME_NETWORK_IE$_{PAYLOAD\_TX}$, then block 403 directs execution flow of the example method 400 to block 405. At block 405, the NN 228 then checks the length of such content and the amount of bandwidth needed to communicate such content. In accordance with one example implementation, the NN 228 receives the event by noting that the ME 314 has reported that content has been loaded. As discussed herein, the ME may report such an event through the ME_NETWORK_IE$_{TX}$ control parameter. In accordance with one example implementation, the NN 228 monitors the ME_NETWORK_IE$_{TX}$ control parameter and notes a change in the status of the control parameter. Having determined the length of the contents of the control parameter ME_NETWORK_IE$_{PAYLOAD\_TX}$, the NN 228 continues to wait for a Beacon message at block 407.

At flow control block 407, when the new node 228 detects a Beacon, execution flow of the example method 400 proceeds to block 409. At block 409, the node 228 will determine from information carried by the Beacon when the next ACF (Admission Control Frame) slot designated for transmission of a Discovery Request message will occur and the length of the ACF slot. At block 409, the NN 228 determines whether the duration of the ACF slot will be sufficient to transit the entire contents of the ME_NETWORK_IE$_{PAYLOAD\_TX}$. If the ACF slot is sufficiently long to allow transmission of the content in the ME_NETWORK_IE$_{PAYLOAD\_TX}$, then execution flow of the example method 400 will proceed to block 411, and the NN 228 will send a Management Entity Request Network IE 503 in the ACF slot scheduled by the NC.

In the example shown in FIG. 5, a determination is made that the standard length ACF is sufficient to allow transmission of the entire contents. Therefore, the NN 228 sends a Management Entity Request Network IE 503. Table 1 shows an example format for the Management Entity Request Network IE.

TABLE 1

(Management Entity Request Network IE)

| Field | Length | Value |
|---|---|---|
| Network IE Header | | |
| TYPE | 8 bits | 0x07 |
| LENGTH | 8 bits | ≤15 |
| | | Actual length, including the IE Header, in bytes = (LENGTH + 1) * 4 |
| Management Entity Request Network IE Payload | | |
| VENDOR_ID | 16 BITS | Identifies the vendor of the node |
| INFORMATION | VARIABLE | UNSPECIFIED |
| PADDING | VARIABLE | To make the length of the IE a multiple of 4 bytes. Padding bytes MUST be set to value 0x00. |

As shown in Table 1, the example TYPE field has a value of 0x07, wherein "0x" indicates that the value is in hexadecimal and the "07" following indicates the particular value that indicates that the IE is a Management Entity Request Network IE. The example INFORMATION field in the payload section of the example Management Entity Request Network IE is loaded with the contents of the control parameter ME_NETWORK_IE$_{PAYLOAD\_TX}$. The PADDING field ensures that the Management Entity Request Network IE ends at a proper byte boundary.

Once the NN 228 has sent the Management Entity Request Network IE at block 411, the NN 228 waits for the response from the NC 212 at block 413. The NC 212 is expected to send a Management Entity Response Network IE 505 in response to the Management Entity Request Network IE 503. In one example implementation, the NN 228 sets a timer to the value indicated by the control parameter ME_NETWORK_IE$_{RESP\_TIMOUT}$. Upon expiration of that timer, the NN 228 may, for example, restart the process (e.g., at block 401 and/or any other block herein).

If the NN 228 receives the Management Entity Response Network IE 507 (e.g., after receiving the Beacon 505) at block 413, then at block 415 the NN 228 copies the value of the payload of the Management Entity Response Network IE 507 to the control parameter ME_NETWORK_IE$_{PAYLOAD\_RX}$. Once the content has been successfully copied, at block 417 the NN 228 sets the control parameter ME_NETWORK_IE$_{REC}$ to report to the ME 314 that the content of ME_NETWORK_IE$_{PAYLOAD\_RX}$ is ready to be read by the ME 314. The admission process may then proceed. For example, The NN 228 may attempt to gain admission in a manner as discussed in U.S. Provisional Patent Application Ser. No. 62/036,496, filed on Aug. 12, 2015, and titled "Method and Apparatus for Admission to a MoCA Network," the entire contents of each of which are hereby incorporated herein by reference (e.g., communicating and/or analyzing network name information, etc.).

If, at flow control block 409, the NN 228 determines that the bandwidth scheduled by the NC 212 in the Beacon 501 is insufficient to allow the NN 228 to send the entire content of the ME_NETWORK_IE$_{PAYLOAD\_TX}$, then at block 419 the NN 228 will request additional bandwidth. In accordance with one example implementation, the NN 228 will send a Discovery Request message comprising a Discovery Request Network IE. The format of an example Discovery Request Network IE is shown in Table 2.

TABLE 2

(Discovery Request Network IE)

| Field | Length | Value |
|---|---|---|
| Network IE Header | | |
| TYPE | 8 bits | 0x00 - Discovery Request Network IE |
| LENGTH | 8 bits | 0x00 |
| Network IE Payload | | |
| RESERVED | 8 bits | Type III |
| ACF_SYM_LENGTH | 4 bits | If DISCOVERY_OPTIONS = 0x3: (ACF_SYM_LENGTH + 1) represents the number of ACF symbols requested for transmitting the pre admission message. Else: Reserved Type III |
| DISCOVERY_OPTIONS | 4 bits | 0x0 - Discover all MoCA Network attributes defined in the standard or a portion thereof. 0x1 - Discover all MoCA Network attributes defined in the standard or a portion thereof and request a MoCA 2.0 Admission Request time slot. 0x2 - Skip Discovery Response and request a MoCA 2.0 Admission Request time slot directly. 0x3 - Request bandwidth for sending a pre admission message longer than this Discovery Request. Other values reserved |

A DISCOVERY_OPTIONS field may, for example, comprise a value that indicates that additional bandwidth is required for sending a pre-admission message (e.g., comprising the Management Entity Request Network IE with the contents of the ME_NETWORK_IE$_{PAYLOAD\_TX}$). Also for example, the DISCOVERY_OPTIONS field may indicate that additional bandwidth is requested for a message other than a pre-admission message (e.g., by assigning other values to the field). An ACF_SYM_LENGTH field may, for example, comprise a value that indicates the length that the NN 228 requires to transmit the contents of the control parameter ME_NETWORK_IE$_{PAYLOAD\_TX}$ (e.g., as part of a Discovery Request message carrying information comprising a Management Entity Request Network IE). In response to the Discovery Request Network IE sent at block 419, the NC 212 transmits a Beacon. The Beacon schedules an ACF slot sufficiently long to allow the NN 228, at block 411, to send the entire contents of the control parameter ME_NETWORK_IE$_{PAYLOAD\_TX}$ in a Management Entity Request Network IE (e.g., as part of a Discovery Request message). The method 400 may then proceed in the same manner as discussed herein with regard to blocks 413 through 417.

If the NN 228 does not receive an event, for example at block 403, then at flow control block 421, the NN 228 will wait for a Beacon. Upon detecting a Beacon, flow control block 421 will direct execution flow of the example method 400 to block 423, at which the NN 228 will send a Discovery Request message, and then to block 425, at which the NN 228 will proceed to attempt to gain admission to the network 208. At block 425, the NN 228 may, for example, attempt to gain admission to the network 208 in a conventional manner. The NN 228 may also, for example, attempt to gain admission in a manner as discussed in U.S. Provisional Patent Application Ser. No. 62/036,496, filed on Aug. 12, 2015, and titled "Method and Apparatus for Admission to a MoCA Network," the entire contents of each of which are hereby incorporated herein by reference.

The discussion of FIGS. 4 and 5 generally present various aspects of the present disclosure from the perspective of an example new node. The following discussion of FIGS. 6 and 7 will now present various aspects of the present disclosure from the perspective of an example network coordinator node. It should be understood that a network node may perform any or all aspects discussed with regard to FIGS. 4-5 and/or FIGS. 6-7.

Figure 6A:
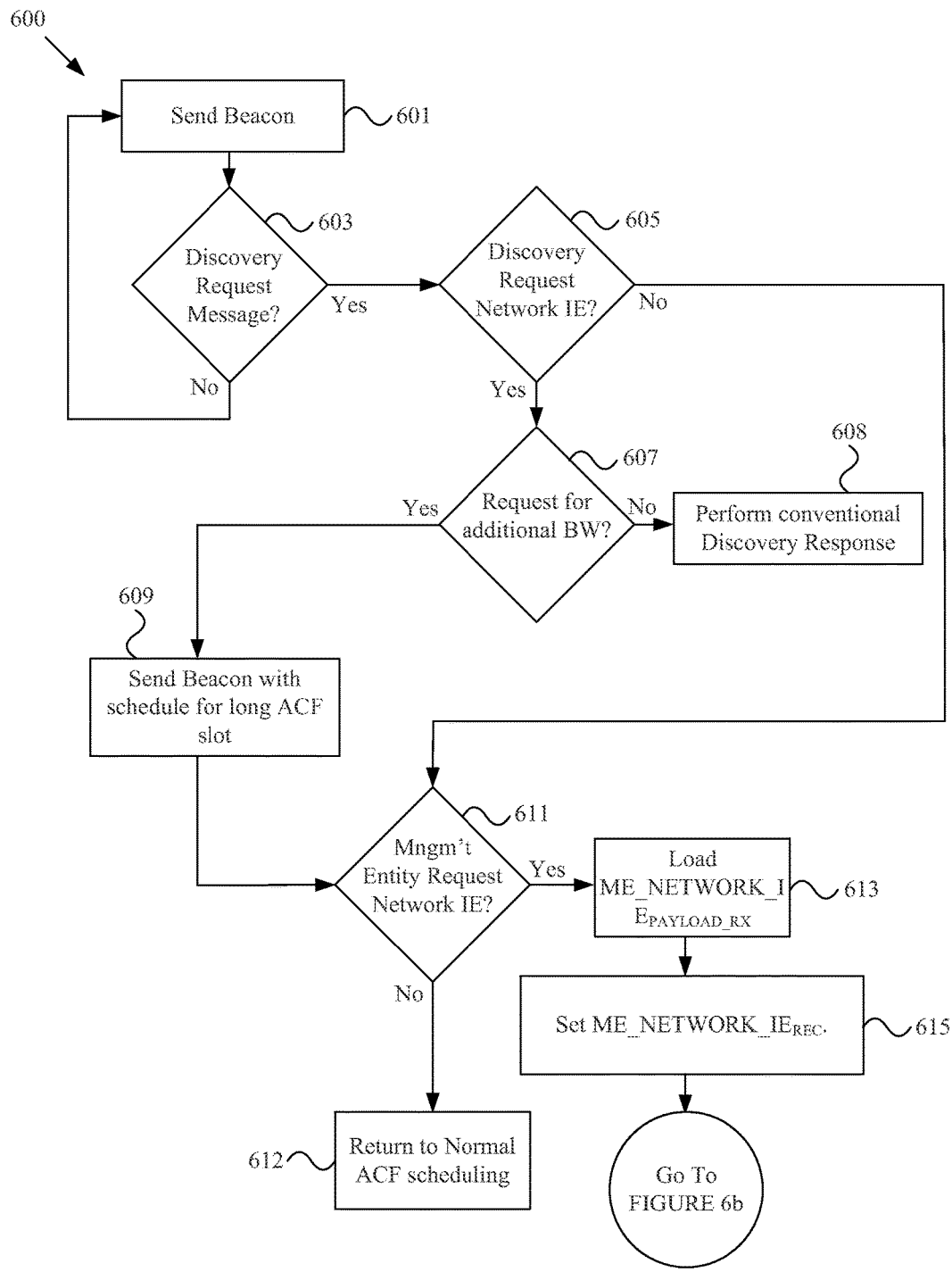
FIG. 6a is a first portion of a flow diagram of an example method, for example performed by a network coordinator node, in accordance with various aspects of the present disclosure.
Figure 6B:
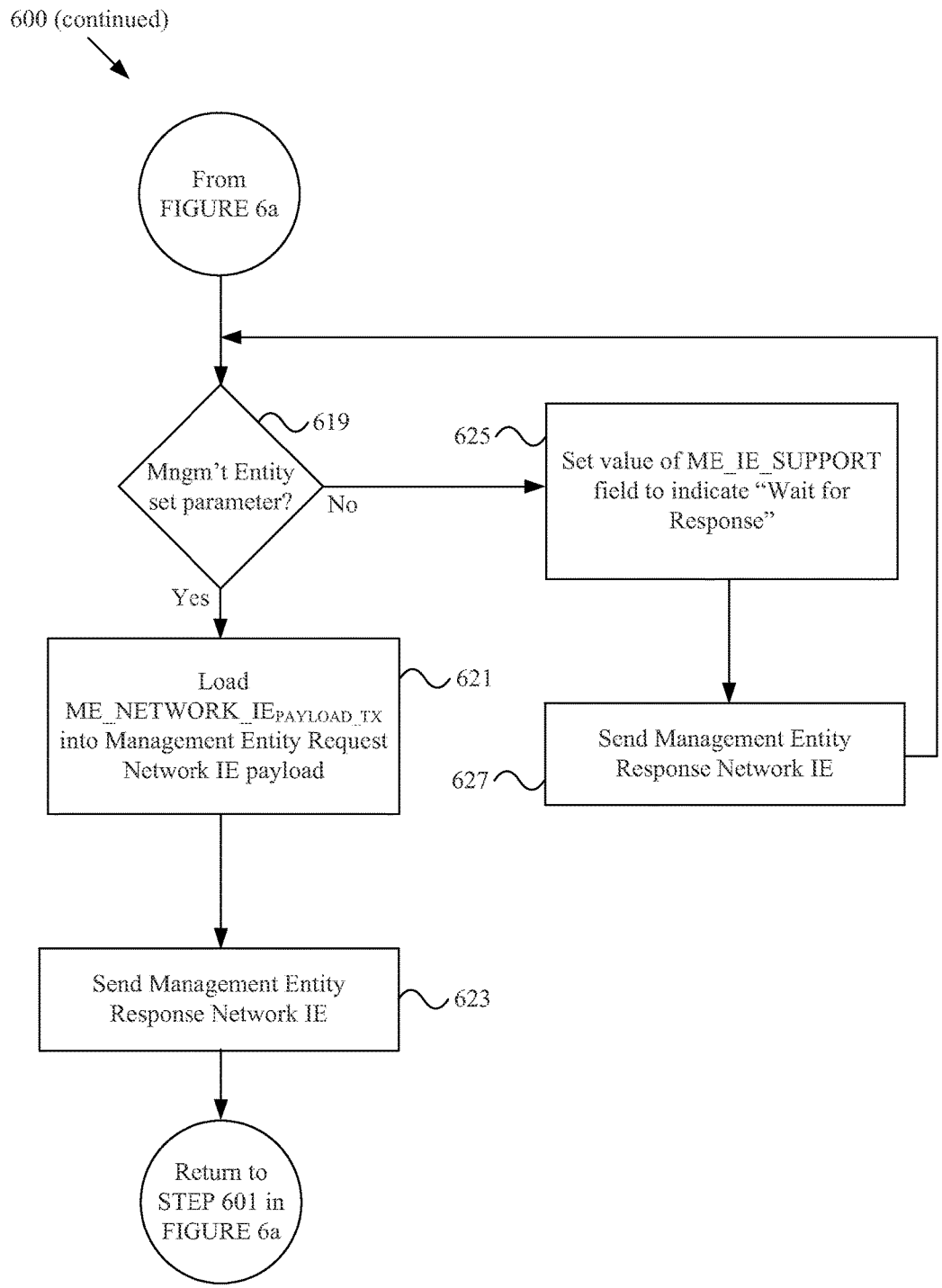
Figure 7:
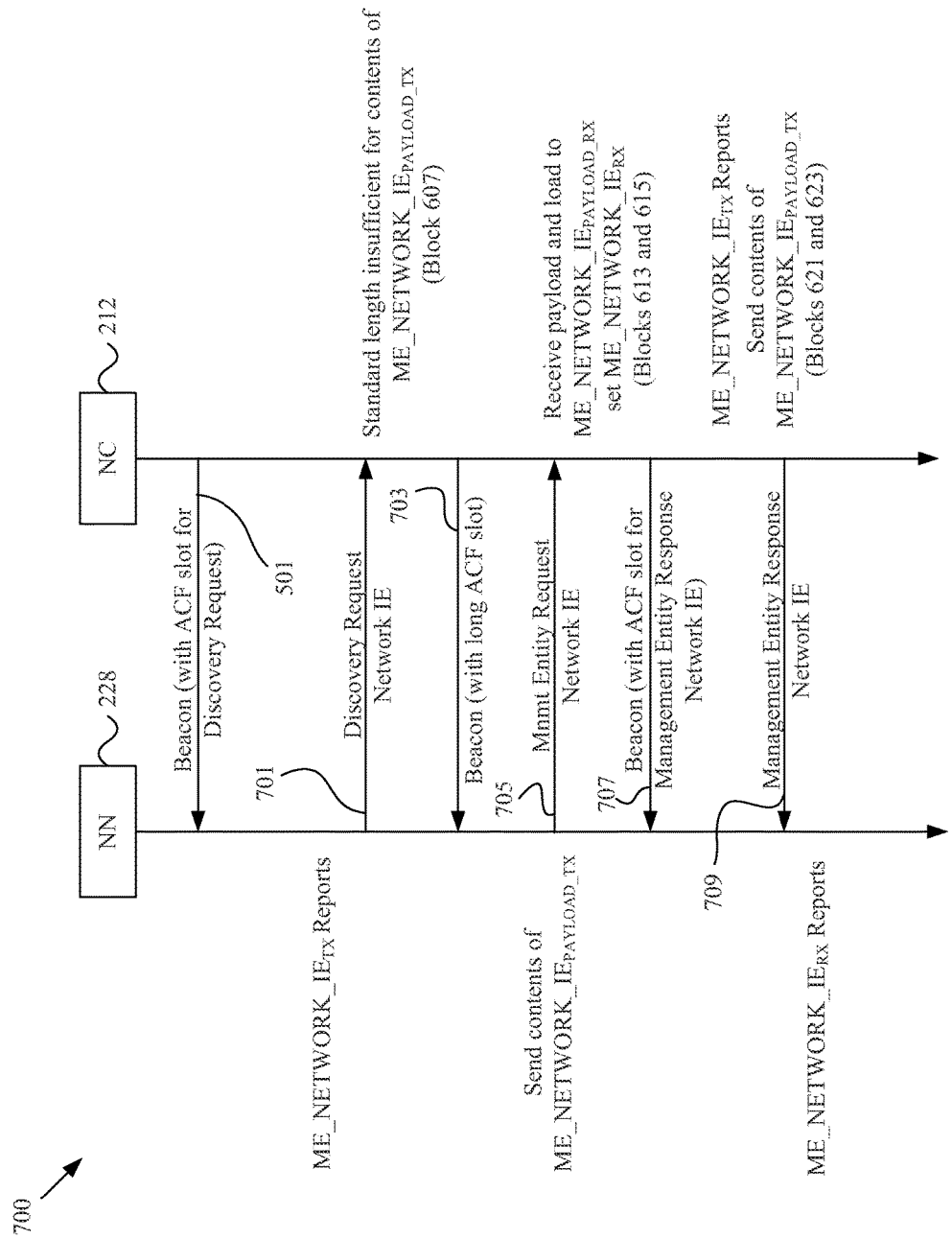
FIG. 7 is a message flow diagram showing an example message flow sequence between a network coordinator node and a new node, in accordance with various aspects of the present disclosure.

FIG. 6a is a first portion of a flow diagram of an example method 600, for example performed by a network coordinator node, in accordance with various aspects of the present disclosure, and FIG. 6b shows a continuation of the flow diagram started in FIG. 6a. FIG. 7 is a message flow diagram showing an example message flow sequence between a network coordinator node and a new node, in accordance with various aspects of the present disclosure. FIGS. 6a, 6b, and 7 will now be discussed together. The example method 600 and message flow 700 may, for example, be performed by any of the nodes discussed herein. For example, the example method 600 may be performed by a node operating as a network coordinator node (e.g., the NC 212 of FIG. 2). Also for example the message flow 700 and/or functionality associated therewith may be performed by a new network node (e.g., the NN 228 of FIG. 2) and a network coordinator node (e.g., the NC 212 of FIG. 2).

At block 601, the NC 212 transmits a Beacon 501 indicating when the next ACF slot is to be scheduled for new nodes to use for sending a Discovery Request message. At flow control block 603, NC 212 checks whether a NN 228 has sent a Discovery Request message 701 during the scheduled ACF slot. If so, then flow control block 603 directs execution flow of the example method 600 to block 605. If not, then flow control block 603 directs execution flow back up to block 601, for example for transmission of a next Beacon.

At block 605, the NC 212 determines whether the received Discovery Request message 701 comprises a Discovery Request Network IE. If so, then the flow control block 605 directs execution flow of the example method 600 to flow control block 607, at which the NC 212 determines whether the DISCOVERY_OPTIONS field indicates that the NN 228 requires additional bandwidth. If not, then the flow control block 605 directs execution flow of the example method 600 to flow control block 611, at which the NC 212 determines whether the received Discovery Request message 701 comprises a Management Entity Request Network IE.

At flow control block 607, if it is determined that the DISCOVERY_OPTIONS field does not indicate that the NN 228 requires additional bandwidth, then execution flow of the example method 600 is directed to block 608, at which the NC 212 may for example send a Discovery Response message (e.g., in a conventional manner). In accordance with one example implementation, the Discovery Request message may comprise both a Discovery Request Network IE and a Management Entity Request Network IE, in which case the Management Entity Request Network IE may, for example, be handled by the method 600 starting at block 611.

In the example message sequence 700 shown in FIG. 7, the NC 212 receives a Discovery Request Network IE 701 (e.g., in a pre-admission Discovery Response message) in which the DISCOVERY_OPTIONS field indicates that additional bandwidth is required, and thus flow control block 607 of the example method 600 directs execution flow to block 609, at which the NC 212 sends a Beacon 703 indicating that a long ACF slot has been scheduled. The NC 212, for example, schedules the ACF slot based on a length indicated by the ACF_SYM_LENGTH field of the received Discovery Request Network IE 701. If the Discovery Request Network IE 701 did not indicate that additional bandwidth was required, then flow control block 607 would have directed execution flow of the example method 600 to block 608 for communicating a Discovery Response message to the NN 228. The NC 212 may perform such messaging in any of a variety of manners, non-limiting examples of which were provided and discussed in U.S. Provisional Patent Application Ser. No. 62/036,496, filed on Aug. 12, 2015, and titled "Method and Apparatus for Admission to a MoCA Network," the entire contents of each of which are hereby incorporated herein by reference (e.g., communicating and/or analyzing network name information, etc.).

At block 611, the NC 212 then waits for another Discovery Request message having a Management Entity Request Network IE 705 from the NN 228. If the NC 212 does not receive a Discovery Request message 705 in the long ACF slot, then flow control block 611 directs execution flow of the example method 600 to block 612, at which the NC begins sending ACF slots in accordance with a normal ACF slot schedule (e.g., in which the ACF slot is not extended to accommodate long Discovery Request messages). In one example implementation in which the NC 212 is operating in accordance with a network standard (e.g., MoCA 2.0, etc.), the NC 212 returns to the conventional scheduling provided by the standard (e.g., MoCA 2.0, etc.).

It should be noted that throughout the process, the example NC 212 may perform all of the conventional functions of an NC for the other nodes 214, 216, 218 of the network, such as scheduling slots for other messages between the other nodes 214, 216, 218 during the Beacons 501, 703.

Upon receiving the Management Entity Request Network IE 705, the flow control block 611 directs execution flow of the example method 600 to block 613, at which the NC 212 loads the contents of the payload of the Management Entity Request Network IE 705 into the control parameter ME_NETWORK_IE$_{RX}$. In addition, at block 615, the NC 212 sets the control parameter ME_NETWORK_IE$_{REC}$ to indicate receipt of the contents from the NN 228. As discussed herein, setting the control parameter ME_NETWORK_IE$_{REC}$ to indicate receipt of the contents from the NN 228 may, for example, notify a Management Entity associated with the NC 212 that the Management Entity Request Network IE 705 has been received from the NN 228 and that the information communicated in the Management Entity Request Network IE 705 is available for the Management Entity.

In further response to receiving the Management Entity Request Network IE, the NC 212 sends a Discovery Response message comprising a Management Entity Response Network IE 709. This message is sent during the ACF slot scheduled in the first Beacon 707 following the reception of the Management Entity Request Network IE 705. Table 3 shows an example format for the Management Entity Response Network IE.

TABLE 3

| (Management Entity Response Network IE) | | |
|---|---|---|
| Field | Length | Value |
| Network IE Header | | |
| TYPE | 8 bits | 0x07 |
| LENGTH | 8 bits | ≤17 |
| | | Actual length, including the IE Header, in bytes = (LENGTH + 1) * 4 |
| Management Entity Response Network IE Payload | | |
| VENDOR_ID | 16 bits | Indicates the particular vendor |
| RESERVED | 14 bits | Type III |

TABLE 3-continued (Management Entity Response Network IE)

| Field | Length | Value |
|---|---|---|
| ME_IE_SUPPORT | 2 bits | 0b00 - Management Entity Request Network IE is supported. Response is provided in INFORMATION field.<br>0b01 - Management Entity Request Network IE is supported. Wait for response.<br>0b10 - Management Entity Request Network IE is not supported. No response will be provided.<br>0b11 - Reserved |
| REQUESTING_VENDOR_ID | 16 BITS | If ME_IE_SUPPORT = 0b00, 0b01, or 0b10<br>   This field is copied from the Discovery Request Management Entity Request Network IE that this IE is responding to.<br>If ME_IE_SUPPORT = 0b11<br>   Reserved Type III |
| INFORMATION | VARIABLE | If ME_IE_SUPPORT = 0b00<br>   Vendor specific.<br>If ME_IE_SUPPORT = 0b01 or 0b11<br>   This field is not sent<br>If ME_IE_SUPPORT = 0b10<br>   This field is copied from the Discovery Request Management Entity Request Network IE that this IE is responding to. |
| PADDING | VARIABLE | To make the total length of the IE multiple of 4 bytes.<br>All padding bytes MUST be set to value 0x00. |

An ME_IE_SUPPORT field of the example Management Entity Response Network IE indicates one of at least three conditions, examples of which are provided herein. The first condition may, for example, be that the NC 212 is prepared to respond and/or is responding to the Management Entity Request Network IE. For example, the NC 212 supports an ME_IE (e.g., the NC 212 can respond appropriately to receipt of a Management Entity Request Network IE). Furthermore, the ME 314 associated with the NC 212 has provided a response to the Management Entity Request Network IE, for example by loading a value into the control parameter ME_NETWORK_IE$_{PAYLOAD\_TX}$ and setting the control parameter ME_NETWORK_IE$_{TX}$.

A second example condition that the NC 212 may indicate is that the NC 212 supports the ME_IE, but the ME 314 has not yet set the ME_NETWORK_IE$_{TX}$ control parameter. In this case, the NC 212 may require more time to allow the ME 314 to prepare a response to the Management Entity Request Network IE 705. A third example condition is that the NC 212 does not support ME_IE.

At block 619, the NC 212 checks whether the ME 314 associated with the NC 212 has provided a response in the control parameter ME_NETWORK_IE$_{PAYLOAD\_TX}$. In accordance with one example implementation, if the ME does not support the received IE, then an additional control parameter ME_NETWORK_IE$_{NOT\_SUPPORTED}$ reports this condition to the NC 212. If the ME 314 set the control parameter ME_NETWORK_IE$_{TX}$, then flow control block 619 directs execution flow of the example method 600 to block 621, at which the NC 212 loads the contents of the control parameter ME_NETWORK_IE$_{PAYLOAD\_TX}$ into the INFORMATION field of the Management Entity Response Network IE 709. The NC 212 then, at block 623, sends the Management Entity Response Network IE 709 to the NN 228, for example in a Discovery Response message. Execution flow of the example method 600 then returns to block 601, at which the NC 212 returns to sending Beacons.

If, at block 619, the ME 314 associated with the NC 212 has not provided the response to the control parameter ME_NETWORK_IE$_{PAYLOAD\_TX}$, then execution of the example method 600 flows to block 625, at which the NC 212 sets the value of the ME_IE_SUPPORT field of the Management Entity Response IE to indicate that the NN 228 should wait for a response. The NC 212, at block 627, then sends the Management Entity Response Network IE to the NN 228, for example in a Discovery Response message. Execution of the example method 600 then flows back to block 619, where NC 212 then waits for the ME 314 associated with the NC 212 to report that the contents of the control parameter ME_NETWORK_IE$_{PAYLOAD\_TX}$ have been loaded with a response.

Figure 8:
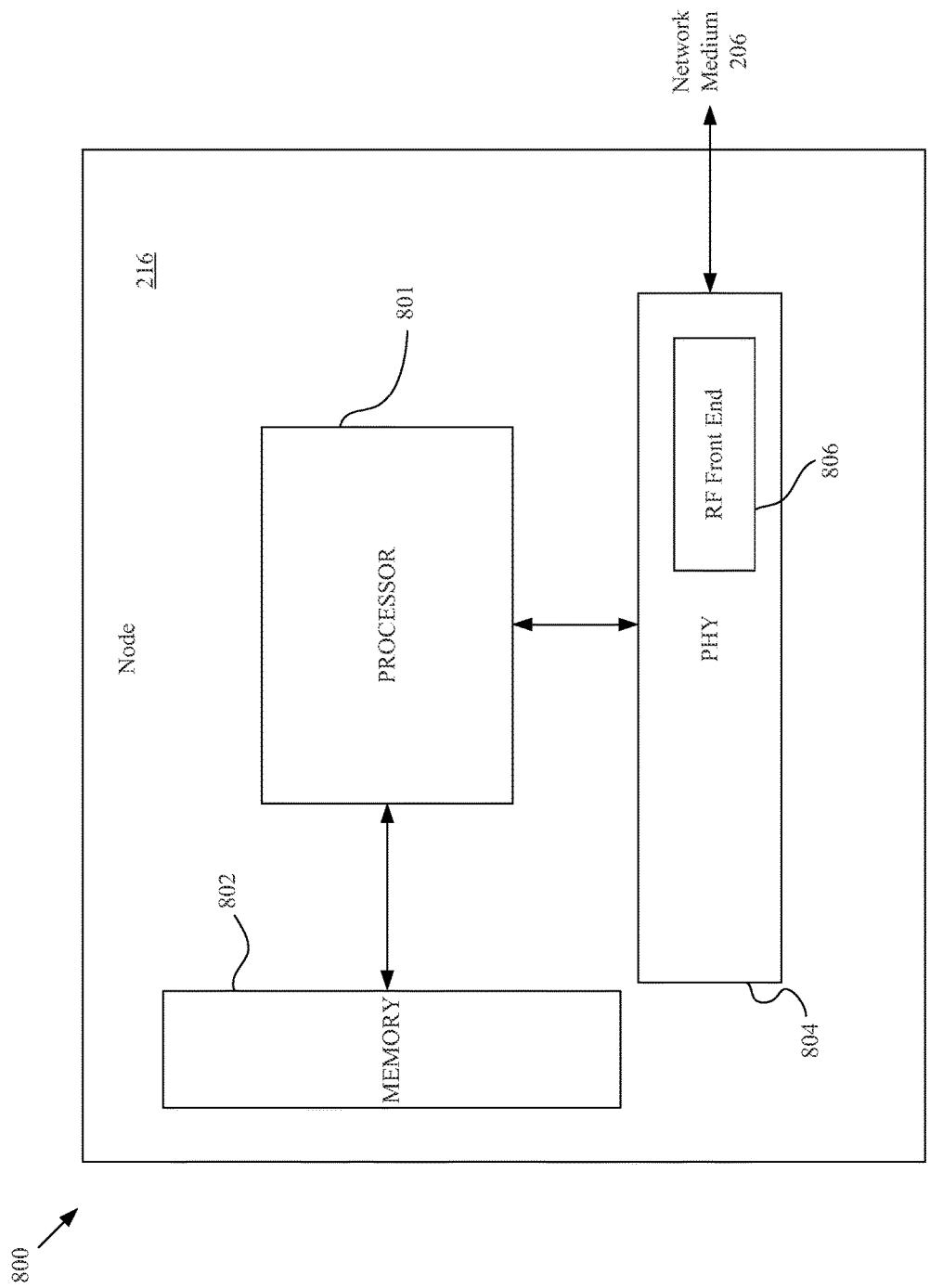
FIG. 8 is a simplified block diagram of example circuitry used to implement a network node, in accordance with various aspects of the present disclosure.

FIG. 8 is a simplified block diagram of example circuitry used to implement a network node 800, in accordance with various aspects of the present disclosure. The network node 800 may, for example, be operable to perform any or all of the node functionality discussed herein (e.g., with regard to FIGS. 1-7). The network node 800 may, for example, share any or all characteristics with any of the nodes discussed herein (e.g., the node 300 of FIG. 3, the nodes 212, 214, 216, 218, 228, 234, 236, and 239 of FIG. 2, the nodes 110, 112, 114, and 116 of FIG. 1, etc.).

The node 800 comprises at least one processor 801, a memory 802, and a PHY 804. The memory 802 is coupled to the processor 801. The PHY 804 includes an RF front end 806. The PHY 804 may also include a dedicated processor (not shown) that performs functions associated with the PHY 804. Alternatively, some control functions of the PHY 804 may be performed by the processor 801. In the transmit path, the PHY 804 and/or RF Front End 806 may receive information from the processor 801. The information is modulated on signals generated by the RF front end 806. The RF front end 806 transmits such signals over a medium 206 (e.g., over coaxial cabling used to connect notes of a MoCA network, etc.). In the receive path, the PHY 804 and/or RF front end 806 receives signals from the medium 206, demodulates the signals to retrieve the information communicated by such signals, and passes the received information to the processor 801 for processing. It should be understood that, while the example node 800 shown in FIG. 8 (and other nodes discussed herein) is described with respect to a node connected to a network via coaxial cable, the node 800 may be connected to the network over any medium.

The processor 801 within the node 800 performs several tasks. The example node 800 is shown and described as having a single processor 801 that performs all of the disclosed tasks and functions of the node 800. Nonetheless, it should be understood that the disclosed tasks and functions of the node 800 may be performed by any combination of hardware, firmware, and software. Furthermore, any software or firmware may be executed by one or a combination of several independent or coordinated processors. For example, in various example implementations, it may be more efficient to use processors dedicated to performing a particular task or group of tasks. Also for example, the processor 801 (or processors) may comprise any of a variety of processing circuits (e.g., general purpose processors, specific purposes processors, microcontrollers, application-specific integrated circuits, programmable state machine devices, analog and/or digital circuitry, etc.). In an alternative embodiment, the node 800 may have several processors that work together or independently. The processor 801 may, for example, read computer readable program code from the memory 802 and execute the code to perform the functions of the DLL 304, the upper layers 312 and/or the ME 314 (see FIG. 3). In one example implementation, the ME 314 is not co-located with the DLL 304. In such an example implementation, the ME 314 may be implemented using a different processor or processors. Likewise, in one example implementation, the upper layers 312 are not co-located with the DLL 304. It should be understood that the particular physical layout of the logical components may vary substantially, so long as the disclosed functionality may be performed. In an alternative implementation, the functions of the DLL 304 and other functions disclosed herein may be performed by dedicated hardware, firmware or a combination of hardware, firmware and software executed by a special or general purpose processor.

In summary, various aspects of this disclosure provide systems and methods for admitting new nodes into an existing network, for example a MoCA network. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network comprising:
a first network node; and
a network coordinator node, wherein:
the first network node comprises at least one circuit operable to, prior to admission to the network, at least:
receive a first beacon from the network coordinator node, the first beacon comprising first timing information that indicates when a first discovery request message may be transmitted and first duration information, different from the first timing information, that indicates a first scheduled duration for transmission of the first discovery request message;
analyze the first duration information to determine whether the first scheduled duration is long enough for transmitting a pre-admission discovery request message;
if the first scheduled duration is long enough for transmitting the pre-admission discovery request message, then transmit the pre-admission discovery request message in accordance with the first timing information;
if the first scheduled duration is not long enough for transmitting the pre-admission discovery request message, where the pre-admission discovery request message comprises a management entity request network information element (MERNIE), then, at least:
transmit an initial discovery request message in accordance with the first timing information, the initial discovery request message comprising information indicating a requested duration for transmission of the pre-admission discovery request message;
receive a second beacon from the network coordinator node, the second beacon comprising second timing information that indicates when a second discovery request message may be transmitted and second duration information that indicates a second scheduled duration, greater than the first scheduled duration, for transmission of the second discovery request message; and
transmit the pre-admission discovery request message in accordance with the second timing information; and
the network coordinator node comprises at least one circuit operable to, at least:
transmit the first beacon comprising the first timing information and the first duration information;
receive the initial discovery request message transmitted by the first network node;
in response to the received initial discovery request message, transmit the second beacon; and
receive the pre-admission discovery request message transmitted by the first network node; and
in response to the received pre-admission discovery request message comprising the MERNIE, transmit a discovery response message that comprises a parameter, wherein:
a first value of the parameter indicates that the MERNIE is supported and a response to the MERNIE is included in the discovery response message;
a second value of the parameter indicates that a response to the MERNIE will be included in a later discovery response message; and
a third value of the parameter indicates that the MERNIE is not supported.

2. The network of claim 1, comprising a management entity, and wherein the at least one circuit of the first network node is operable to store a plurality of control parameters in a memory, the control parameters comprising:
a management entity transmit payload parameter by which the first network node may receive information from the management entity to include in a request message sent to the network coordinator node; and
a management entity receive payload parameter by which the first network node may provide information received in a response message from the network coordinator node to the management entity.

3. The network of claim 1, wherein the pre-admission discovery request message selectively comprises one or both of a Discovery Request Network Information Element and a Management Entity Request Network Information Element.

4. The network of claim 1, wherein the second scheduled duration equals the requested duration.

5. The network of claim 1, wherein the second value of the parameter indicates that the MERNIE is supported and a response to the MERNIE will be included in a later discovery response message.

6. A network node comprising:
at least one circuit operable to, prior to admission to a network, at least:
receive a first beacon from a network coordinator node, the first beacon comprising first timing information that indicates when a first discovery request message may be transmitted and first duration information, different from the first timing information, that indicates a first scheduled duration for transmission of the first discovery request message;

analyze the first duration information to determine whether the first scheduled duration is long enough for transmitting a pre-admission discovery request message; and if the first scheduled duration is not long enough for transmitting the pre-admission discovery request message, where the pre-admission discovery request message comprises a management entity request network information element (MERNIE), then, at least:

transmit an initial discovery request message in accordance with the first timing information, the initial discovery request message comprising information indicating a requested duration for transmission of the pre-admission discovery request message;

receive a second beacon from the network coordinator node, the second beacon comprising second timing information that indicates when a second discovery request message may be transmitted and second duration information that indicates a second scheduled duration, greater than the first scheduled duration, for transmission of the second discovery request message; and transmit the pre-admission discovery request message in accordance with the second timing information; and receive a discovery response message responsive to the pre-admission discovery request message, wherein the discovery response message comprises a parameter, and wherein:

a first value of the parameter indicates that the MERNIE is supported and a response to the MERNIE is included in the discovery response message;

a second value of the parameter indicates that a response to the MERNIE will be included in a later discovery response message; and a third value of the parameter indicates that the MERNIE is not supported.

7. The network node of claim 6, wherein the at least one circuit is operable to, if the first scheduled duration is long enough for transmitting the pre-admission discovery request message, then transmit the pre-admission discovery request message in accordance with the first timing information.

8. The network node of claim 6, wherein the at least one circuit is operable to store a plurality of control parameters in a memory, the control parameters comprising a management entity transmit payload parameter by which the network node may receive information from a management entity to include in a request message sent to the network coordinator node.

9. The network node of claim 8, wherein the control parameters comprise a management entity receive payload parameter by which the network node may provide information received in a response message from the network coordinator node to the management entity.

10. The network node of claim 9, wherein the control parameters comprise a receive indication parameter that indicates to the management entity that the network node has received information for the management entity.

11. The network node of claim 6, wherein the at least one circuit is operable to determine whether to populate the pre-admission discovery request message with one or both of a Discovery Request Network Information Element and a Management Entity Request Network Information Element.

12. The network node of claim 6, wherein the at least one circuit is operable to receive management entity information from a management entity and include the received management entity information in the pre-admission discovery request message.

13. The network node of claim 6, wherein the MERNIE comprises a header that identifies the MERNIE as a management entity request network information element, and a payload comprising information received from a management entity.

14. The network node of claim 6, wherein the at least one circuit is operable to, after transmitting the pre-admission discovery request message, monitor beacons until the network node either receives a discovery response message indicating that the management entity request network information element is supported and including a management entity response information element, or a timer expires.

15. A network node comprising:

at least one circuit operable to, at least:

transmit a first beacon comprising first timing information that indicates when a first discovery request message may be transmitted over a network and first duration information, different from the first timing information, that indicates a first scheduled duration for transmission of the first discovery request message;

receive the first discovery request message from a first node that has not yet been admitted to the network, where the first discovery request comprises information indicating a requested duration for transmission of a pre-admission discovery request message; and in response to the received first discovery request message, transmit a second beacon comprising second timing information that indicates when a second discovery request message may be transmitted and second duration information that indicates a second scheduled duration for transmission of the second discovery request message, where the second scheduled duration is longer than the first scheduled duration; and receive the pre-admission discovery request message in accordance with the second timing information, wherein:

the received pre-admission discovery request message comprises a management entity request network information element (MERNIE);

the first scheduled duration is insufficient for communication of the MERNIE with the first discovery request message; and the at least one circuit is operable to, in response to the received pre-admission discovery request message comprising the MERNIE, transmit a discovery response message that comprises a parameter, wherein:

a first value of the parameter indicates that the MERNIE is supported and a response to the MERNIE is included in the discovery response message;

a second value of the parameter indicates that a response to the MERNIE will be included in a later discovery response message; and a third value of the parameter indicates that the MERNIE is not supported.

16. The network node of claim 15, wherein the second scheduled duration equals the requested duration.

17. The network node of claim 15, wherein the at least one circuit is operable to load at least a portion of a payload of the received pre-admission discovery request message in a control parameter in memory and notify a management entity of the loaded payload.

18. The network node of claim 15, wherein the at least one circuit is operable to post at least a portion of a payload of the MERNIE to a control parameter and notify a management entity of the post.

19. The network node of claim 15, wherein the second value of the parameter indicates that the MERNIE is supported and a response to the MERNIE will be included in a later discovery response message.

* * * * *